March 10, 1970 R. E. DYER 3,500,162

SYSTEM FOR PROVIDING DC VALUES REPRESENTATIVE OF PHASE DIFFERENCE

Filed March 27, 1968 2 Sheets-Sheet 1

INVENTOR.
ROBERT E. DYER

BY

ATTYS.

March 10, 1970 R. E. DYER 3,500,162
SYSTEM FOR PROVIDING DC VALUES REPRESENTATIVE
OF PHASE DIFFERENCE
Filed March 27, 1968 2 Sheets-Sheet 2

INVENTOR.
ROBERT E. DYER
BY Brown Jackson Boettcher & Dienner
ATTYS.

United States Patent Office 3,500,162

Patented Mar. 10, 1970

3,500,162

SYSTEM FOR PROVIDING DC VALUES REPRESENTATIVE OF PHASE DIFFERENCE

Robert E. Dyer, Springfield, Ill., assignor to Sangamo Electric Company, Springfield, Ill., a corporation of Delaware

Filed Mar. 27, 1968, Ser. No. 716,625

Int. Cl. H02p *5/06;* H02k *27/20*

U.S. Cl. 318—314 12 Claims

ABSTRACT OF THE DISCLOSURE

Phase detection circuit for use in speed control of tape recorder, which circuit compares the phase of a reference and a comparison signal to provide an instantaneous average value of the phase difference with substantially zero time delay. The reference and comparison signals are changed to four digital signals from which the average value of the input signal information is extracted on a continuous basis by a series of linear amplifier operations and provided as a DC potential output having a magnitude proportional to the phase error of the two input signals.

BACKGROUND OF INVENTION

Field of invention

The present invention relates to phase detection circuits for providing error signals for speed control of tape recorders.

Description of prior art

In many fields, the efficient use and application of a motor driven unit has become dependent upon the provision of a control circuit which will maintain operation of the driven member at a selected speed. One such field is the tape recording art in which the recording capabilities of the recorder, and particularly a recorder which is used for recording scientific data and other high frequency signals, is basically dependent upon the ability of the system to operate the tape drive at a selected constant speed. Such ability is in turn dependent upon the provision of a speed control circuit which is capable of instantaneous detection of speed error and the instantaneous correction of an error as detected.

In one well known form of speed control used for tape drives, error detection means are provided which compare the phase of a reference frequency with the phase of a signal derived from the tape drive. Generally speaking, in such system the reference signal and the tape drive signal are quantized and compared to provide an error signal which comprises a rectangular wave having a duty cycle proportional to the phase difference. In most instances, the resultant error signal must be further modified, as for example, by averaging the error signal to obtain a control signal that contains only phase variations of the controlled device with respect to the reference source.

Methods commonly used in obtaining the average value of the rectangular error signal waveform are low pass electric wave filters using LRC or RC components in any of the various configurations such as Chebishev, Butterworth, etc.; for LRC or lattic, T, Pi combination of RC networks. All of these techniques involve real time delay in the process of converting to the average value. The time delay increases as the carrier waveform is further suppressed by the use of additional complex filters that contain more pole and zeros. In applications that do not require a very high order of performance, in that either the residual error signal can be large or the speed of response can be relatively slow, a real time delay can be tolerated by the control system. However, it is often the case that the control system is limited in error resolution.

Of even more consequence the control system is frequently limited in its speed of response due to the real time delay occurring in the signal processing of the error signal through the system for the reasons described above.

SUMMARY OF INVENTION

It is an object of the present invention to provide a novel system in which signal processing is effected with substantially reduced time delay, and specifically a system which enables the continuous processing of a phase difference error signal to the average value within the electrical transit time involved in transmission thereof through the electronic circuit. Such time is several orders of magnitude less than that of the equivalent real time delay of other known systems using the same degree of filtering.

The novel system basically comprises means for providing a signal representative of the speed of the tape drive and a reference oscillator for providing a reference signal at a selected frequency. The two signals are fed as rectangular waveforms to a function generator which provides four digital output signals. A series of linear amplifier circuits determine the average value of the information input on a continuous basis, and provide a DC output potential which at any instant of time is equal to the average value of the input. The process is continuous and involves no time delay in signal processing other than the transit time, whereby servo response is correcting speed deviations of the tape drive is practically without time delay.

GENERAL DESCRIPTION

Figure 1:
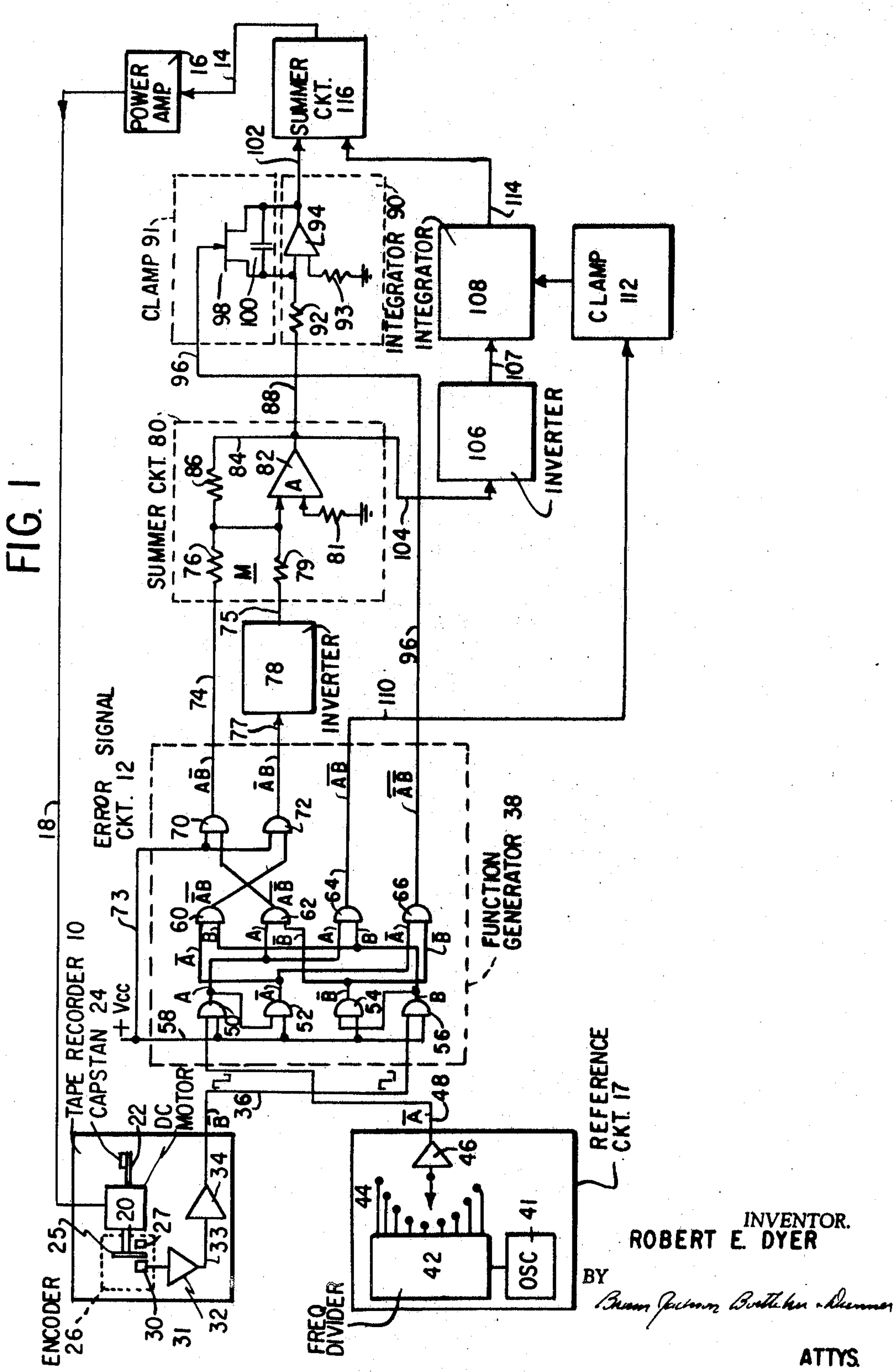
FIGURE 1 is a diagram of the novel speed control circuit for the tape recorder system including the novel electronic filter of the invention.

With reference to FIGURE 1, there is shown thereat a tape recorder 10 and an error signal circuit 12 which is operative to provide a DC potential signal output over conductor 14 to a DC power amplifier 16 for coupling over path 18 to a DC motor 20 for the tape drive of tape recorder 10. The signal provided by error signal circuit 12 is continually adjusted to a value which maintains the speed of motor 20 at a constant preselected value. As will be shown, encoder means 26 in tape recorder 10 provide output signals which are representative of the tape speed over path 36 to error signal circuit 12, and reference circuit 17 provides a reference signal over path 48 to error signal circuit 12 for phase comparison purposes. The signal output on conductor 14 from the error signal circuit 12 is a DC signal which is proportional to the phase difference between the reference and comparison signal.

More specifically, tape recorder 10 includes a tape-drive capstan 24 directly driven by shaft 22 of a DC motor 20. An encoder unit 26 is connected in driven relation to the opposite end of shaft 22 on motor 20. Encoder unit 26 may comprise a commercial device available from Sequential Systems, Elmsford, N.Y., which basically comprises a code perforated disc 25 which in its passage between a light source 27 and a light sensitive pickup unit 30 provides 5000 sine wave bits per revolution over output path 31.

It will be apparent that the pulse output of the encoder 26 over paths 31 will be at a rate which is determined by the speed of motor 20, and that a change in the speed of the DC motor 20 will result in a corresponding change in the pulse output rate.

The pulse output of the pickup unit 30 on conductor 31 is fed over an amplifier stage 32 to a squaring wave amplifier 34 which may comprise a Schmidt trigger circuit of well known design. The output of the squaring amplifier 34 on conductor 36 consists of a square wave $\overline{B}$ for each sine wave output from encoder 26 at a rate which is directly related to the sine wave pulses and thereby the speed of the DC drive motor 20.

Reference oscillator circuit 17 basically comprises an oscillator 41, the output of which is coupled over a frequency divider 42 and a selected one of nine outputs via selector switch 44, a squaring amplifier 46 and conductor 48 to provide a square wave output $\overline{A}$ over conductor 48 to a second input of function generator 38. The oscillator 41 in one embodiment comprised a 400 kc. crystal oscillator which was connected over a frequency divider circuit 42 having eight terminals for providing outputs at 100 kc., 50 kc., 25 kc., 12½ kc., 6.25 kc., 3.125 kc., 1562 kc. and 781 cycles, respectively. The tape drive signal $\overline{B}$ on conductor 36 and the reference signal $\overline{A}$ on conductor 48 are fed to the two inputs of a digital function generator 38 which includes three quad gates comprised of two-input Nand gates of $T^2L$ logic connected to provide four logical binary output signals which in terms A, B comprise A $\overline{B}$, $\overline{A}$ B, $\overline{A}\,\overline{B}$, and $\overline{\overline{A}\,\overline{B}}$.

More specifically, the function generator 38, as shown in FIGURE 1, comprises a first set of four Nand gates 50, 52, 54 and 56. Gate 50 has a first input connected to receive reference signal $\overline{A}$ from reference circuit 17, gate 52 has a first input connected to the output of gate 50, gate 56 has a first input connected via conductor 36 to receive encoder signal $\overline{B}$ from encoder circuit 26, and gate 54 has a first gate connected to the output of gate 56. The second input of each of the gates is connected over conductor 58 to a potential source V*cc*, which in one embodiment was in the order of +5 v.

The first quad gate converts the input signals $\overline{A}$, $\overline{B}$ into four outputs A, $\overline{A}$, B, $\overline{B}$, as shown, which are directed to the inputs of second quad gates 60, 62, 64, 66. Gate 60 has its two inputs connected to $\overline{A}$, B outputs of gate 52, 56; the inputs of gate 62 are connected to the A, $\overline{B}$ outputs of gates 50, 54; the inputs of gate 64 are connected to the A B outputs of gates 50, 56, and the inputs of gate 66 are connected to the $\overline{A}\,\overline{B}$ outputs of gates 52, 54.

In gate 60, $\overline{A}$, B are Nanded to form the product $\overline{\overline{A}\,\overline{B}}$; in gate 62 A $\overline{B}$ are Nanded to form the product $\overline{\overline{A}\,\overline{B}}$. The gate 64 Nands A B to provide $\overline{\overline{A}\,\overline{B}}$ and gate 66 Nands $\overline{A}\,\overline{B}$ to provide $\overline{\overline{A}\,\overline{B}}$.

The output $\overline{\overline{A}\,\overline{B}}$ of gate 60 is fed to one input of gate 72 and the output $\overline{A\,\overline{B}}$ of gate 62 is fed to one input of Nand gate 70. The second input of gates 70, 72 is connected via conductor 73 to power supply V*cc* which was approximately +5 in one emboiment. Nand gates 70 and 72 provide outputs A $\overline{B}$ and $\overline{A}$ B over output paths 74, 77.

The next portion of the error signal circuit basically comprises a group of six operational amplifiers and two clamp circuits. More specifically, the output A $\overline{B}$ of gate 70 is fed over the conductor 74 to one input of summer circuit 80, and the output $\overline{A}$ B of gate 72 is fed over inverter 78 to the second input of summer circuit 80. The output $\overline{\overline{A}\,\overline{B}}$ of gate 64 is fed over conductor 110 to a clamp circuit 112, and the output $\overline{\overline{A}\,\overline{B}}$ of gate 66 is fed via conductor 96 to clamp 91.

Summer circuit 80 basically comprises a mixer circuit M including resistors 76, 79 connected to the conductors 74, 75 (products A $\overline{B}$–($\overline{A}$ B). The output of mixer M is connected to one input for operational adder 82. The second input of the operational adder 82 is connected over resistance 81 to ground. The arithmetic sum of the inputs on conductors 74, 75 (as multiplied by a constant to optimize the signal to noise ratio) is obtained at the output conductor 88 and is fed via feedback resistor 86 to the first input of operational adder 82. The output of summer circuit 80 on conductor 88 is also fed to an operational integrator 90 and via conductor 104 to an operational inverter 106. The output of inverter 106 is extended over conductor 107 to an operational integrator 108 which is identical in structure to the integrator 90.

Integrator circuit 90 basically comprises an operational amplifier 94 having a first input connected via resistor 92 to the output 88 of summer circuit 80 and a second output connected over resistor 93 to ground. A feedback capacitor 100 is connected across the one input and the output of the operational amplifier 94. A field effect transistor 98, which is connected to operate as a clamp, is connected across capacitor 100. The gate of field effect transistor 98 is connected via conductor 96 to the output $\overline{\overline{A}\,\overline{B}}$ of gate 66. As will be shown, the integrator 90 is clamped to zero output by clamp 91 during the period that the output $\overline{\overline{A}\,\overline{B}}$ of the function generator 38 is zero, and the integrator 108 is clamped to zero output by clamp 112 during the period that the output $\overline{A}\,\overline{B}$ is zero. Clamping operations are used to insure the establishment of predetermined initial reference conditions for each cycle of integration, and the respective clamping operations, as will be shown, are 180° out of phase with each other. The outputs of integrators 90 and 108 are connected via conductors 102, 104 to a summer circuit 116 which is identical to summer circuit 80. The outputs of the integrators 90, 108 are added arithmetically by summer circuit 116 to obtain the sum thereof. As will be shown, the sum of the outputs of integrators 90 and 108 is a constant at any instant of time. The summed output of summer circuit 116 is fed over path 14 and power amplifier 16 and path 18 to the armature of DC motor 20.

SPECIFIC OPERATION OF SPEED CONTROL CIRCUIT

Figure 2:
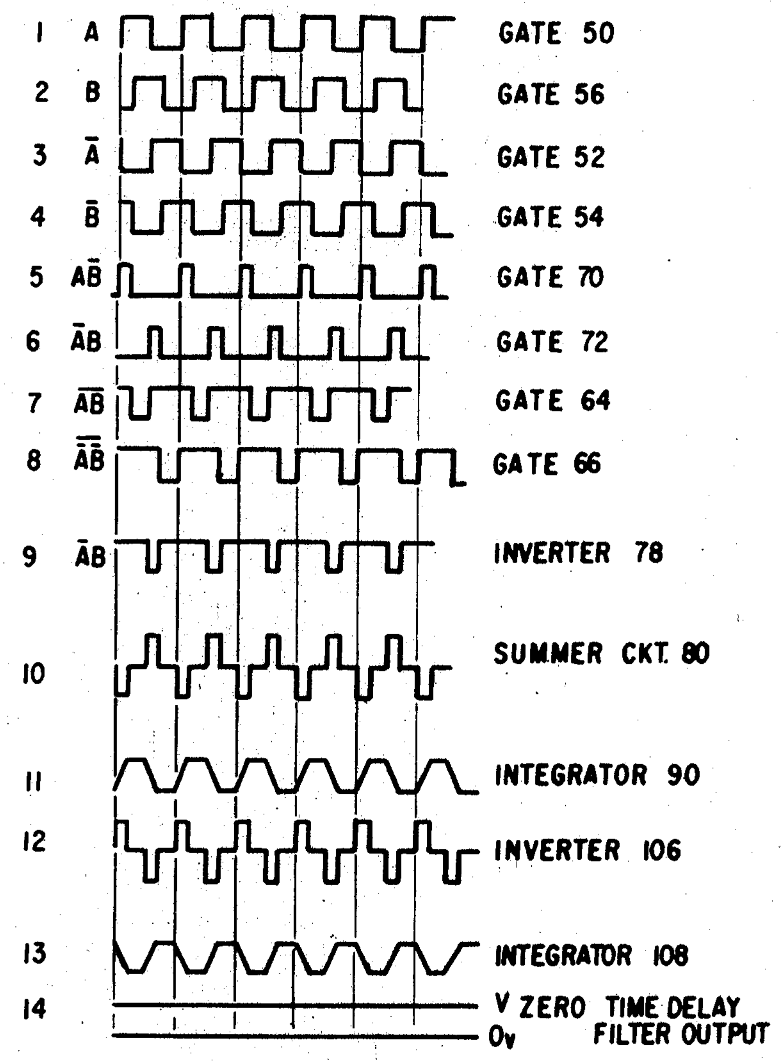
FIGURE 2 is a diagram of waveforms output from the various components in the circuit of FIGURE 1.

With reference now to FIGURE 2, the waveforms there shown illustrate the outputs of the various stages in error signal circuit 12 and reference is made thereto in the following disclosure of the operation of the circuit of FIGURE 1.

It will be first assumed that the phase lock of the tape drive DC motor 20 is slightly less than the selected speed as represented by the reference signal B. As a result thereof, the waveform output $\overline{A}$ from the reference circuit 17 will lead the waveform output $\overline{B}$ from the encoder circuit 26 by a phase angle which is indicated by the time difference between the leading edge of the waveforms A and B in lines 1 and 2 of FIGURE 2. If the motor 20 was at the selected speed, the leading edge of waveform B (line 2) would coincide with the leading edge of the waveform A (line 1). It will be assumed for purposes of the disclosure that the signal representing the reference signal $\overline{A}$ does not lag behind the motor speed representative of signal $\overline{B}$.

With reference to FIGURES 1 and 2, it will be seen that the four gates 50, 52, 54, 56 provide an output A $\overline{A}$, $\overline{B}$ B in response to an input of $\overline{A}$, $\overline{B}$ from the reference circuit 17 and encoder 26. The difference in time between the leading edge of signals A, B (lines 1 and 2—FIG. 2) represents the assumed difference in phase of the two signals of 72°.

Gate 70 (FIGURE 1) at its output provides product A $\overline{B}$ shown in line 5 of FIGURE 2. The duty cycle (width) of the pulse shown in line 5 varies directly with the phase difference of the signals A, B as will become apparent by alignment of the leading and trailing edge of the pulse of line 5 with the leading edges of the pulses A, B lines 1 and 2. The output $\bar{A}\ B$ of gate 72 as shown in line 6 is a pulse of similar duty cycle delayed by approximately 180° from the pulse $A\ \bar{B}$ in line 5. At this point, therefore, the function generator 38 has provided two pulses $A\ \bar{B}$, $\bar{A}\ B$, 180 degrees out of phase, which have a duty cycle or width representative of the phase difference between the reference and comparison signals.

The pulse output $\overline{A\ B}$, $\overline{\bar{A}\ \bar{B}}$ of gates 64, 66 in function generator 38 is shown in lines 7 and 8, and as there shown has a duty cycle or width related to the time difference between the pulses $\bar{A}\ B$ and $A\ \bar{B}$. These pulses are used for clamping purposes as will be described.

As noted heretofore, the four digital signals output from function generator 38 are fed to a series of linear amplifiers which continuously extract the average value of the information input. The pulse output $\bar{A}\ \bar{B}$ of gate 72 is fed through inverter 78, and the resultant output is mixed with the output $A\ \bar{B}$ of gate 70 in the mixer circuit 76, 79 and added by operational adder 82 in summer circuit 80. The resultant pulse is shown in line 10, FIG. 2. The pulse output of summer circuit 80 is fed over conductor 88 to operation integrator 90, and also over conductor 104 to inverter 106.

It will be recalled that the gates 64, 66 provide signals to the clamps 91, 112 for use in presetting the operational integrator 90 and 108, respectively, to zero output during the period that the output of the function generator $\overline{A\ B}$ and $\overline{\bar{A}\ \bar{B}}$ is zero respectively (lines 7 and 8, FIG. 2). As will be shown, the clamps 91, 112 insure that the integrators will start from the same reference point (zero v. in the present example) in each cycle so that the output waveform of the integrator will accurately represent the phase difference of the input signals. More specifically, the output $\overline{A\ B}$ of gate 64 (line 7) controls clamp 112 to reset integrator 108 immediately prior to transmission of the leading edge of a pulse by inverter 106 (line 12) to integrator 108. As shown by the waveform in FIGURE 2, the width of such pulse identifies the phase difference in the two signals. Reset of the integrator circuit to zero immediately before the receipt of such pulse, insures that the output of the integrator will accurately represent the phase difference indicated by the pulse.

In a similar manner, the output $\overline{\bar{A}\ \bar{B}}$ on conductor 96 output from gate 66 (line 7) controls clamp circuit 91 to clamp the integrator 90 to zero which again represents the phase difference of the input signals $\bar{A}$, $\bar{B}$, and which is 180 degrees out of phase with the leading edge of the signal input to the pulse integrator 108.

The waveform output of integrator 90 is shown in line 11 of FIGURE 2. It will be recalled that the width of the pulses $A\ \bar{B}$, $\bar{A}\ B$ output from gates 70, 72 in the function generator 38 indicate the phase difference between the reference and the comparison signal, and that the product thereof output from summer circuit 80 (line 10) is fed over conductor 88 to the integrator 90 (and over inverter 106 to integrator 108).

The application of the signal waveform output from summer circuit 80 (line 10) to integrator 90 will result in a symmetrical trapezoidal waveform output from integrator 90 (line 11). The output of integrator 108 which is fed by the waveform output of summer circuit 80 (as inverted) will result in a symmetrical trapezoidal waveform such as shown in FIGURE 13, the two waveforms by reason of the inversion being such that when one integrator, such as 90, changes in an increasing direction, the other integrator 108 changes in a decreasing direction and vice versa. When the waveform of the one integrator 90 is at a maximum amplitude and during the flat portion of such waveform, the other integrator, such as 108, is clamped to zero and vice versa.

Figure 3:
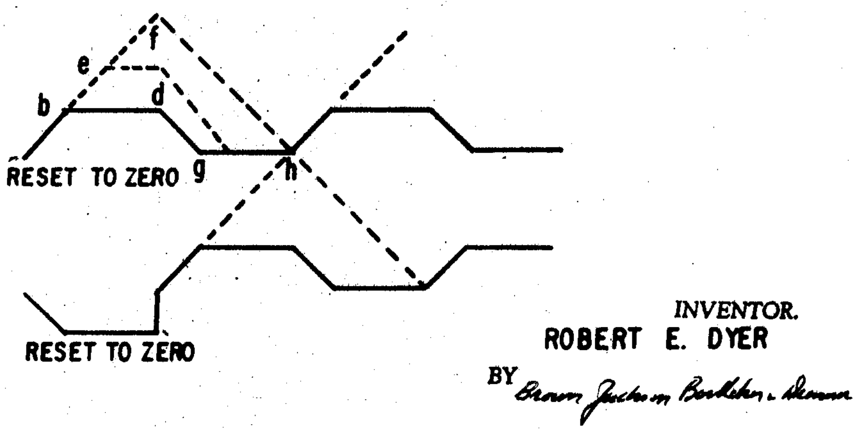
FIGURE 3 is a waveform illustration of the manner in which the phase difference representative signals are generated in the system.

The manner in which the integrators provide such output waveform is perhaps best appreciated by reference to the waveforms shown in FIGURES 2 and 3. It will be recalled that capacitor 100 is clamped to zero by clamp 71 during the pulse $\overline{\bar{A}\ \bar{B}}$ (line 8). As the leading edge Y of the first negative pulse output from summer circuit 80 (line 10) is fed to integrator 90, operational amplifier 94 charges the capacitor 100 for a period (and therefore to a level) which is a function of the width of the negative pulse input thereto. Thus with reference to the upper portion of FIGURE 3, with an assumed phase difference of 72 degrees, the capacitor 100 charges for the portion indicated by the solid black line. If a greater phase difference exists, the pulse input to the integrator 90 would be wider (a longer duty cycle) and the charging of the capacitor 100 would take place for a correspondingly long period which extends along the dotted portion as for example to position *e* or *f*.

As the trailing edge of the waveform output from summer circuit 80 (line 10) occurs, the output of summer circuit 80 return to zero, and capacitor 100 in the integrator 90 remains charged as evidenced by the flat portion *b*, *d* of the waveform (FIG. 3). (Also see line 11, FIG. 2.)

As the leading edge of the next positive pulse output from summer circuit 80 (line 10) occurs, operational amplifier 94 completes a discharge circuit for capacitor 100 and the trailing edge *d*, *g* of the waveform (FIG. 3) is generated. As the positive pulse (line 10) returns to zero level the clamping signal output from gate 66 (line 8) becomes effective and clamps capacitor 100 to zero level until such time as the subsequent negative going pulse output from summer circuit 80 (point *h*) is received.

The waveform output (line 13) from integrator 108 via conductor 114 is generated in a like manner but 180 degrees out of phase relative to the waveform output from integrator 90 (line 11). In this case reset of integrator 108 to zero by clamp 112 occurs prior to generation of the leading edge of the negative going pulse output from inverter 106 (line 12). Charging of the capacitor in integrator 108 occurs for the duration of the negative pulse (line 12) and is terminated with the occurrence of the trailing edge of the negative pulse (line 12). The charge on the capacitor is held at such level until generation of the leading edge of the next positive-going pulse (line 12). During the positive pulse the capacitor is discharged, and as the positive pulse returns to zero level clamp 112 is effective to clamp the capacitor to zero. It is significant to note that during the period the capacitor in integrator 108 is charging, the capacitor in integrator 90 is discharging. Further, such change in the charge of the capacitors is occurring as the input pulse representing the phase difference of the input signal is fed into the system so that any change in value of the input signal is instantaneously reflected in the change of the capacitor charge and therefore the output signals from the integrators 90, 108.

It will be apparent from the foregoing description that the amplitude of the pulses output from integrators 90, 108 will be determined by and representative of the phase difference between the reference and comparison signals input to the function generator 38.

The output waveforms of integrators 90 and 108 (lines 11 and 13) provided over conductors 102, 114 are added by the operational adder in summer 116 (which is similar to summer circuit 80) to produce an output voltage on conductor 14 which is proportional to the average value of the phase difference of the input multiplied by a constant. With reference to line 14, FIGURE 2, when the phase difference of the reference and comparison signal is 72 degrees, the DC voltage input will be of the value shown in line 14. Obviously, with zero phase difference the potential will be at zero value.

The variable DC output potential from summer circuit 116 is fed over conductor 14 and amplifier 16 and conductor 18 to the armature input terminal for DC motor 20. Variation of the potential input to such terminal effects a corresponding change in the torque of the motor 20. Thus in the present example in which the tape drive signal $\overline{B}$ lags the reference signal $\overline{A}$ by 72° the signal input to DC motor 20 will increase the motor torque, and thereby bring the reference and tape drive signals into equilibrium. As the phase difference of the two signals decreases, the amplitude of the signal output over conductor 14 decreases toward zero.

In that the average value of the error signal has been obtained by linear amplifier circuits without the use of wave filters and the like, the signal output for effecting speed correction is accomplished with substantially zero delay. As a result, an improved form of speed control is provided.

While what is described is regarded to be a preferred embodiment of the invention, it will be apparent that variations, rearrangements, modifications and changes may be made therein without departing from the scope of the present invention as defined by the appended claims.

What is claimed is:

1. In a system for providing an error signal related to speed variations of the motor drive means for a tape recorder, input means including reference means for providing a first signal $\overline{A}$ for reference purposes, and means for providing a second signal $\overline{B}$ representative of the speed of said drive means, means for deriving error signals indicating a difference in phase between the frequency of said first and second signals $\overline{A}$, $\overline{B}$ comprising function generator means for providing a first error signal $A\,\overline{B}$ having a duty cycle related to the phase difference of said first and second signals $\overline{A}$, $\overline{B}$, and a second error signal $\overline{A}\,B$ of like duty cycle 180° out of phase with said first error signal $A\,\overline{B}$, summer means for providing a first output signal which is the sum of said first and second signals, and a second output signal which is inverted from and 180° out of phase with said first output signal, first and second integrator means for integrating said first and second output signals to provide a first and a second set of symmetrical trapezoidal signals displaced 180° relative to each other, each of which trapezoidal signals has an amplitude related to the phase difference of said first and second signals $\overline{A}$, $\overline{B}$, and summer means for adding the output of said first and second integrator means to provide a DC potential signal having an amplitude related to said phase difference, and means for coupling said DC potential signal to the speed control means for said motor.

2. In a speed control system for a tape recorder, means for deriving an error signal indicating a difference in phase between the frequency of a first and a second input signal comprising function generator means for providing a first error signal having a duty cycle related to the phase difference of said first and second input signals, and a second error signal of like duty cycle 180° out of phase with said first error signal, means for providing one output signal which is the sum of said first and second error signal, means for providing a second output signal which is inverted from and 180° out of phase with said one output signal, first and second integrator means for integrating said first and second output signals, and summer means for adding the output of said first and second integrator means.

3. In a system as set forth in claim 1 in which the output signal of each of said integrator means comprises a symmetrical trapezoidal waveform which has an amplitude related to the phase difference of said first and second input signals, the output of said first integrator means being displaced 180° from the output of said second integrator means, and in which the output from said summer means comprises a constant value DC potential signal for each phase difference having an amplitude related to said phase difference.

4. In a system as set forth in claim 2 which has input means for providing signals $\overline{A}$, $\overline{B}$ for said first and second signals and in which said function generator means includes logic means for generating signals $A\,\overline{B}$ and $\overline{A}\,B$ for said first and second error signals.

5. In a system as set forth in claim 3 in which said logic means comprises four NAND gates connected to provide output signals A, $\overline{A}$, B, $\overline{B}$, in response to said input signals, $\overline{A}$, $\overline{B}$, and a first and second pair of NAND gates connected to the output of said four NAND gates to provide said error signals $A\,\overline{B}$ and $\overline{A}\,B$.

6. In a system as set forth in claim 3 which includes further logic means connected to the output of said four NAND gates to provide third and fourth signals $\overline{\overline{A}\,B}$ and $\overline{A\,\overline{B}}$.

7. In a system for providing an error signal related to phase variations of a controlled device with respect to a reference phase, input means for providing a first signal representative of the speed of the controlled device, reference means for providing a second signal for reference purposes, means for deriving an error signal indicating a difference in phase between the frequency of a first and second input signal comprising function generator means for providing a first error signal having a duty cycle related to the phase difference of said first and second input signals; a second error signal of like duty cycle 180° out of phase with said first error signal, a first clamping signal and a second clamping signal, means for providing one output signal which is the sum of said first and second error signals, means for providing a second output signal which is inverted from and 180° out of phase with said first output signal, first and second integrator means for integrating said first and second output signals, clamp means controlled by said clamping signals for resetting said integrator means to a predetermined reference point prior to each integration, and summer means for adding the signal outputs of said first and second integrator means.

8. In a speed control system for a tape recorder, means for deriving an error signal indicating a difference in phase between the frequency of a first and a second input signal comprising function generator means for providing a first error signal having a duty cycle related to the phase difference of said first and second input signals, and a second error signal of like duty cycle 180° out of phase with said first error signal, summer means for providing a first output signal which is the sum of said first and second error signal, inverter means connected to said summer means for providing a second output signal which is inverted from and 180° out of phase with said first output signal, first integrator means for integrating said first output signal, second integrator means for integrating said second output signal, and summer means for adding the output of said first and second integrator means.

9. In a system as set forth in claim 8 in which each of said integrators includes an operational amplifier, and a capacitor connected across said mplifier to be charged to a value which is determined by the duty cycle of the output signal applied thereto.

10. A system as set forth in claim 9 in which said capacitors in said first and second integrators are charged 180° out of phase, and in which said output signals control the capacitor in one integrator to charge and the capacitor in the other integrator to discharge during the same periods.

11. A system as set forth in claim 9 in which each of said first and second output signals comprises a negative portion and a positive portion, and in which each integrator is operative in response to the negative portion of said output signal to initiate charging of the capacitor associated therewith to a value determined by the width of said negative portion, and in which said integrator is operative to effect discharge of said capacitor during the positive portion of said output signal.

12. A system as set forth in claim 11 which includes a clamping circuit for each integrator to reset its associated capacitor to zero, and in which said function generator means provides a signal to said clamping means prior to receipt of the negative portion of each output signal by the integrator.

References Cited

UNITED STATES PATENTS

| | | | |
|---|---|---|---|
| 2,803,792 | 8/1957 | Turner | 318—314 |
| 2,803,793 | 8/1957 | Wible | 318—314 |
| 3,050,163 | 10/1962 | Kinney et al. | 318—314 |
| 3,174,090 | 3/1965 | Hall | 318—318 |

BENJAMIN DOBECK, Primary Examiner

L. L. HEWITT, Assistant Examiner

U.S. Cl. X.R.

307—232; 328—133

UNITED STATES PATENT OFFICE
CERTIFICATE OF CORRECTION

Patent No. 3,500,162 Dated March 10, 1970

Inventor(s) Robert E. Dyer

It is certified that error appears in the above-identified patent and that said Letters Patent are hereby corrected as shown below:

Column 3, line 51, $\bar{\bar{A}}\ \bar{\bar{B}}$ should be $\overline{\bar{A}\ B}$;

line 52, $\bar{\bar{A}}\ \bar{\bar{B}}$ should be $\overline{A\ \bar{B}}$;

line 53, $\overline{\bar{A}\ \bar{B}}$ should be $\overline{A\ B}$;

line 56, $\overline{\bar{A}\ \bar{B}}$ should be $\overline{\bar{A}\ B}$;

line 70, $\overline{\bar{A}\ \bar{B}}$ should be $\overline{A\ B}$;

Column 5, line 17, $\bar{A}\ \bar{B}$ should be $\bar{A}\ B$;

Column 8, line 56, "mplifier" should be -- amplifier --.

Signed and sealed this 7th day of November 1972.

(SEAL)
Attest:

EDWARD M.FLETCHER,JR.
Attesting Officer

ROBERT GOTTSCHALK
Commissioner of Patents

USCOMM-DC 60376-P69
U.S. GOVERNMENT PRINTING OFFICE : 1969 O-366-334